April 21, 1931.  S. VACCARI  1,802,129
SAW
Filed Nov. 19, 1928  2 Sheets-Sheet 1
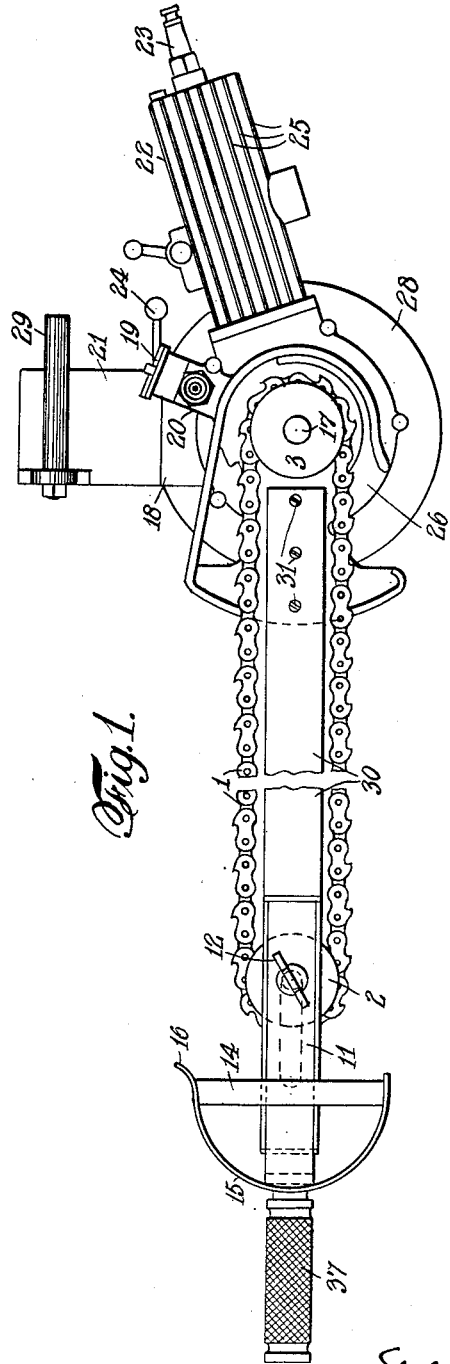
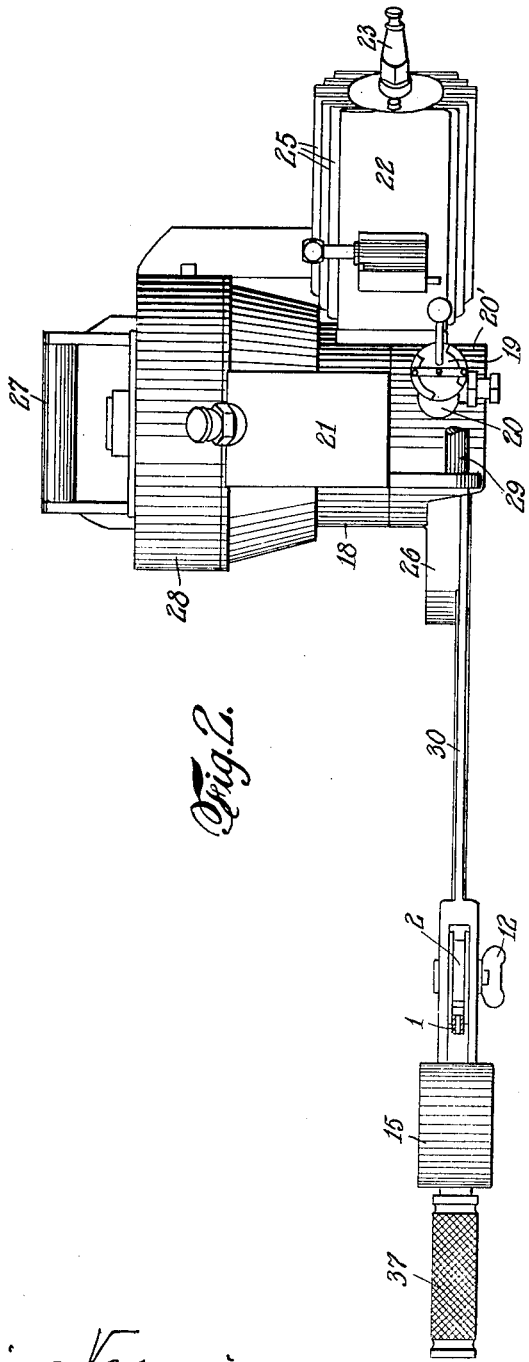
INVENTOR
Severino Vaccari
Wm. S. Pritchard BY
ATTORNEY

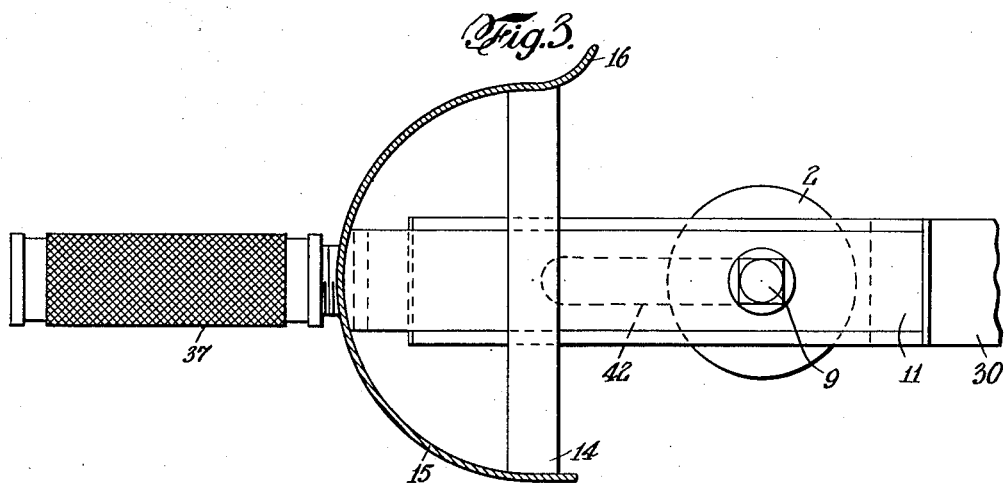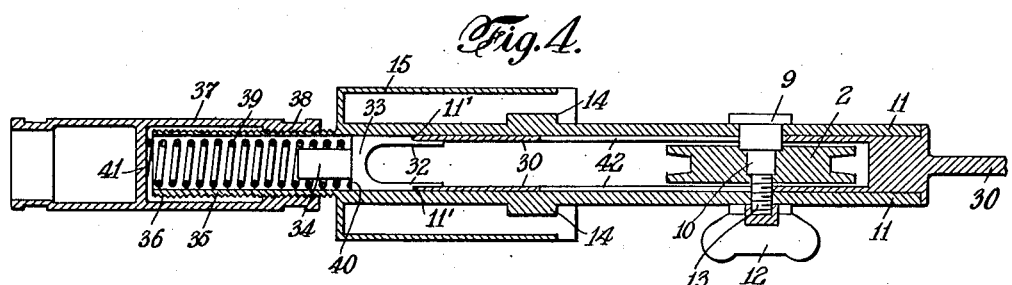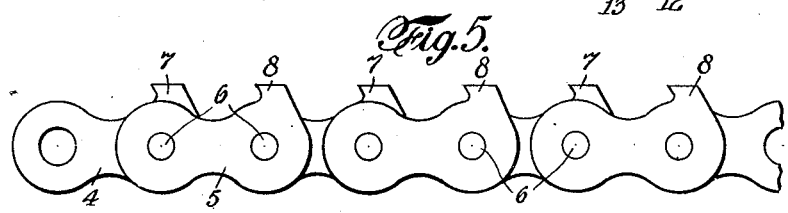

Patented Apr. 21, 1931

1,802,129

UNITED STATES PATENT OFFICE

SEVERINO VACCARI, OF TRIESTE, ITALY, ASSIGNOR TO TITO R. JONGHI, OF BUENOS AIRES, ARGENTINA

SAW

Application filed November 19, 1928, Serial No. 320,275, and in Canada November 22, 1928.

This invention relates to a saw and more particularly to a power-driven portable saw.

In the felling of trees and the cutting of trunks of trees, large logs and the like into smaller sizes, saws manually operated by two men were generally used. These saws comprised a toothed blade having handles at each end thereof, whereby it was gripped by the operators and reciprocated back and forth across and through the material being cut. This procedure required great manual effort, was tedious and costly.

I have found that I can overcome these disadvantages by making a portable power-driven saw which is easy to manipulate, economical to operate and cheap to manufacture.

It is, therefore, an object of this invention to produce a portable power-driven saw.

Another object of this invention is to provide a portable saw comprising a sprocket chain having cutting teeth.

Another object of this invention is to provide a portable saw comprising a sprocket chain having cutting teeth, said chain being actuated by a gas engine.

A further object of this invention is to provide a saw comprising a sprocket chain having cutting teeth, and means for adjusting and maintaining said chain in suitable cutting position.

Still further objects will appear from the following description, appended claim and accompanying drawings in which:

Figure 1 illustrates a plan view of the saw constituting this invention.

Figure 2 is a side elevation thereof.

Figure 3 illustrates the handle mechanism and means for mounting one of the wheels over which the cutting mechanism is traversed.

Figure 4 is a sectional view of Figure 3.

Figure 5 is a fragmentary plan view of the chain illustrating the cutting teeth.

Figure 6 is a top view of the chain illustrated in Figure 5.

Referring now to the drawings wherein like reference numerals designate like parts, the reference numeral 1 designates a chain traversing or trained over wheels 2 and 3. The chain may be of the usual type and it may consist of links 4 and 5 connected together by pins 6. Both the links 4 and 5 are provided with cutting teeth 7 and 8 respectively. In the drawings I have shown the teeth formed integrally with the links. It is to be understood that it is within the purview of this invention to form the teeth separately from said links and mount them thereon in any suitable manner. Instead of both sets of links having cutting teeth, only one set of links may be provided therewith. The teeth may be so constructed as to form a crosscut saw or a rip saw.

The wheel 2 is mounted on a screw 9, the portion 10 thereof constituting a shaft. The screw 9 is mounted in arms 11 and is kept in position by a wing nut 12 engaging a threaded extension 13. The arms 11 are rigidly connected to or integral with uprights 14 integrally formed or rigidly joined to a casing 15, said casing forming a guard. The upper end 16 of said guard may be flared upwardly as illustrated or in any such other configuration.

The wheel 3 is mounted on the end of a stub shaft 17 directly connected to a crank (not shown) of the gas engine 18, whereby rotation of said sprocket wheel is obtained. The gas engine 18 includes a carburetor 19 mounted in a boss 20 on the crank-case 20' between the fuel supply tank 21 and the explosion or combustion chamber 22. A spark plug 23 is suitably disposed in the explosion or combustion chamber, whereby the fuel may be ignited. To regulate the mixture of gas, a valve 24 is provided whereby any desired quantity of air may be introduced into the chamber 22. In engines of this type it is desirable to cool the explosion chamber 22. With this in mind I increase the area of the exterior surface of the chamber by providing said surface with fins 25. The carburetor 19 may be of any type. I prefer to use the carburetor described in my copending application Serial No. 320,274.

A casting 26 having the contour illustrated in the drawings or any other shape is mounted on the crank-case 20', providing a guard and preventing any injury to the operator manipulating this end of the device. By means of handle 27 suitably disposed on the fan casing 28, and handle 29, this end of the mechanism may be gripped and supported by the operator during operation.

In apparatus of this type, it is desirable that the chain with the cutting teeth be maintained in a substantially taut condition, and that the chain be mounted so as to permit ready removal and exchange. With this in view, one end of a bar 30 is removably secured by any suitable means, such as screws 31, to the casting adjacent the wheel 3. The other end of the bar is bifurcated, said bifurcated portion extending between the arms 11 and having its ends 11' engage shoulders 32 of a bifurcated member 33 disposed in the center of the guard or casing 15. A stem 34 of the bifurcated member 33 extends into a hollow sleeve 35 secured or formed integrally with the casing 15. The exterior surface of the sleeve 35 is provided with threads 36 with which a hollow handle 37 having a tapped portion 38 is adapted to cooperate. Surrounding the stem 34 and disposed within the hollow sleeve 35 is a spring 39. One end of the spring 39 bears against the flange or seat 40, and the other end bears against a seat 41 suitably disposed in the handle. By this means just described, the bar 30 is continuously urged forward. Also, by rotation of the handle 37 the tension on the spring 39 may be adjusted, thus controlling the tension of the chain. To allow movement of the bar 30, the bifurcated portion thereof is provided with slots 42 through which the screw 9 extends and serves as a guide.

In assembling the saw, the chain 1 is threaded over the wheels 2 and 3. The bar 30 is then secured to the casting 26 and the handle 37 rotated until the desired tension is obtained. The saw is then held by the handles 27, 29 and 37 by two men and the cutting teeth brought into contact with the material to be cut or severed. The gas engine is then started and the saw operates. To remove the chain 1 for any purpose, the handle 37 is screwed until the tension of the spring 39 does not urge the bar 30 forward. The bar 29 is then unscrewed from the casting and the chain removed from the sprocket wheel 3. To remove the chain from the sprocket wheel 2, the wing nut 12 is unscrewed and the screw 9 removed.

From the above it is seen that I have produced an efficient, durable, easily operable, portable saw. The entire mechanism may be easily carried or transported by a single man.

Since it is obvious that changes may be made in the specific details above described, I do not limit myself thereto except as set forth in the appended claim.

I claim:

A portable saw comprising a chain having cutting teeth, two wheels over which said chain is trained, guards adjacent said wheels, means for adjusting the tension of said chain by urging said wheels apart comprising two supporting arms, a wheel carrying a shaft mounted in said arms, a bar connected to one of said wheels and having a bifurcated slotted end extending between said arms and embracing said shaft, a slidable member engaging the free end of said bar, a sleeve, a stem on said member extending into said sleeve, a spring surrounding said stem and continuously urging said member and bar forward relatively to said arms, a handle movably disposed on said sleeve and a seat within said handle cooperating with one end of said spring.

In testimony whereof, I have affixed my signature to this specification.

SEVERINO VACCARI.